(12) United States Patent
Steward et al.

(10) Patent No.: US 9,976,543 B2
(45) Date of Patent: May 22, 2018

(54) TRANSMISSION FOR MOTOR VEHICLE AND METHOD OF PUMPING TRANSMISSION FLUID THROUGH THE TRANSMISSION

(71) Applicant: Ford Global Technologies, LLC, Dearborn, MI (US)

(72) Inventors: Mark Steward, Ann Arbor, MI (US); Brian Orr, Macomb, MI (US); Mark Marchie, Highland, MI (US); William Riley, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1053 days.

(21) Appl. No.: 14/269,706

(22) Filed: May 5, 2014

(65) Prior Publication Data

US 2015/0316142 A1   Nov. 5, 2015

(51) Int. Cl.
| | | |
|---|---|---|
| *F04B 9/02* | (2006.01) | |
| *F16H 61/00* | (2006.01) | |
| *F16H 57/04* | (2010.01) | |
| *F04B 19/04* | (2006.01) | |
| *F04B 23/02* | (2006.01) | |

(52) U.S. Cl.
CPC ............... *F04B 9/02* (2013.01); *F04B 19/04* (2013.01); *F16H 57/04* (2013.01); *F16H 57/0441* (2013.01); *F16H 57/0452* (2013.01); *F16H 57/0494* (2013.01); *F16H 61/0025* (2013.01); *F04B 23/021* (2013.01); *F16H 2061/0037* (2013.01)

(58) Field of Classification Search
CPC .................................................. F16H 57/0441
See application file for complete search history.

(56) References Cited

U.S. PATENT DOCUMENTS

| 5,404,964 A | * | 4/1995 | Zinsmeyer | .............. F04D 25/02 |
| | | | | 184/13.1 |
| 6,325,604 B1 | | 12/2001 | Du | |
| 2013/0323015 A1 | * | 12/2013 | DeWald | .............. B60K 17/344 |
| | | | | 415/1 |

FOREIGN PATENT DOCUMENTS

| EP | 1128095 | 2/2001 |
| EP | 1130236 | 2/2001 |
| WO | 2010/066594 | 6/2010 |

* cited by examiner

*Primary Examiner* — William Kelleher
*Assistant Examiner* — Gregory Prather
(74) *Attorney, Agent, or Firm* — Diederiks & Whitelaw, PLC

(57) ABSTRACT

A transmission for a motor vehicle includes an input shaft, a transmission pump, a transmission sump and a pump-driving element, which is preferably a drive gear. The drive gear and the transmission pump are located in the transmission sump. Power is transmitted from the input shaft to the transmission pump through the drive gear. In a preferred embodiment, power is transmitted from the input shaft to the drive gear through at least one gear, and from the drive gear to the transmission pump through a pump shaft. The drive gear is preferably at least partially enclosed by a shroud, coupled to the transmission pump, in order to separate the drive gear from transmission fluid located in the transmission sump and thereby reduce drag on the drive gear. The shroud preferably also includes a discharge port so that transmission fluid located in the shroud is expelled through the discharge port when the drive gear rotates.

22 Claims, 6 Drawing Sheets

TRANSMISSION FOR MOTOR VEHICLE AND METHOD OF PUMPING TRANSMISSION FLUID THROUGH THE TRANSMISSION

BACKGROUND OF THE INVENTION

The present invention pertains to a transmission for a motor vehicle and, more particularly, to a transmission arrangement where a transmission pump is located in a transmission sump.

In a typical transmission for a motor vehicle, a transmission pump is located on an input shaft so as to receive power from the vehicle's engine. The transmission pump draws transmission fluid from a transmission sump (also known as a reservoir or oil pan), and circulates the fluid throughout the transmission to lubricate, cool and actuate the various components of the transmission.

As transmission designs become increasingly complex, size and packaging constraints make it difficult to locate the transmission pump on the input shaft without the transmission becoming too long. Therefore, there is a need in the art for a transmission arrangement where the transmission pump is not located on the input shaft.

SUMMARY OF THE INVENTION

The present invention is directed to a transmission for a motor vehicle that includes an input shaft, a transmission pump, a transmission sump and a pump-driving element, which is preferably a drive gear. The drive gear and the transmission pump are located in the transmission sump. Power is transmitted from the input shaft to the transmission pump through the drive gear. In a preferred embodiment, power is transmitted from the input shaft to the drive gear through at least one gear, and from the drive gear to the transmission pump through a pump shaft. The drive gear is preferably, at least partially enclosed by a shroud, coupled to the transmission pump, in order to separate the drive gear from transmission fluid located in the transmission sump and thereby reduce drag on the drive gear. The shroud is spaced from the drive gear and pump shaft so that the drive gear and the pump shaft do not directly contact the shroud when rotating. The shroud preferably also includes a discharge port so that transmission fluid located in the shroud is expelled through the discharge port when the drive gear rotates.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
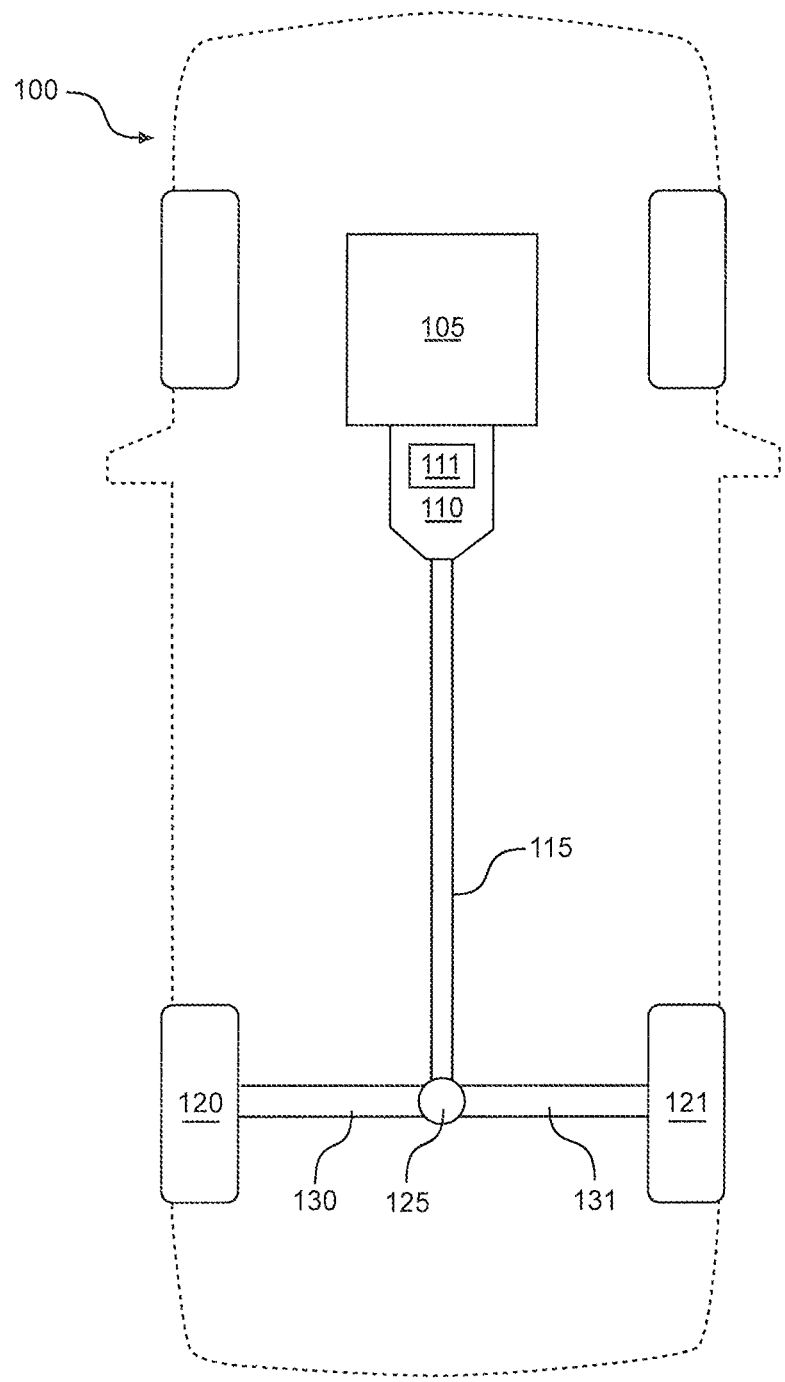
FIG. 1 is a schematic view of a motor vehicle in accordance with the present invention.

With initial reference to FIG. 1, there is shown a motor vehicle 100 in accordance with the present invention. Vehicle 100 has a power source 105, such as an internal combustion engine or an electric motor, connected to a transmission 110. Transmission 110 includes a transmission pump assembly 111 for circulating transmission fluid throughout transmission 110 in order to lubricate, cool and actuate the various components of transmission 110. Power is transmitted from power source 105 to transmission 110 and then to a driveshaft 115, which transmits the power to rear wheels 120, 121 through a differential assembly 125 and half shafts 130, 131. In such a configuration, vehicle 100 is a rear-wheel drive vehicle. However, additional configurations are usable in connection with the present invention. For example, in other embodiments, vehicle 100 is front-, four- or all-wheel drive. In the four- and all-wheel drive embodiments, vehicle 100 would also include a transfer case, a second driveshaft, a second differential assembly and two more half shafts (not shown). Additionally, power source 105 does not need to be located in a front portion of vehicle 100, but can instead by located elsewhere, as in a rear- or a mid-engine embodiment.

Figure 2:
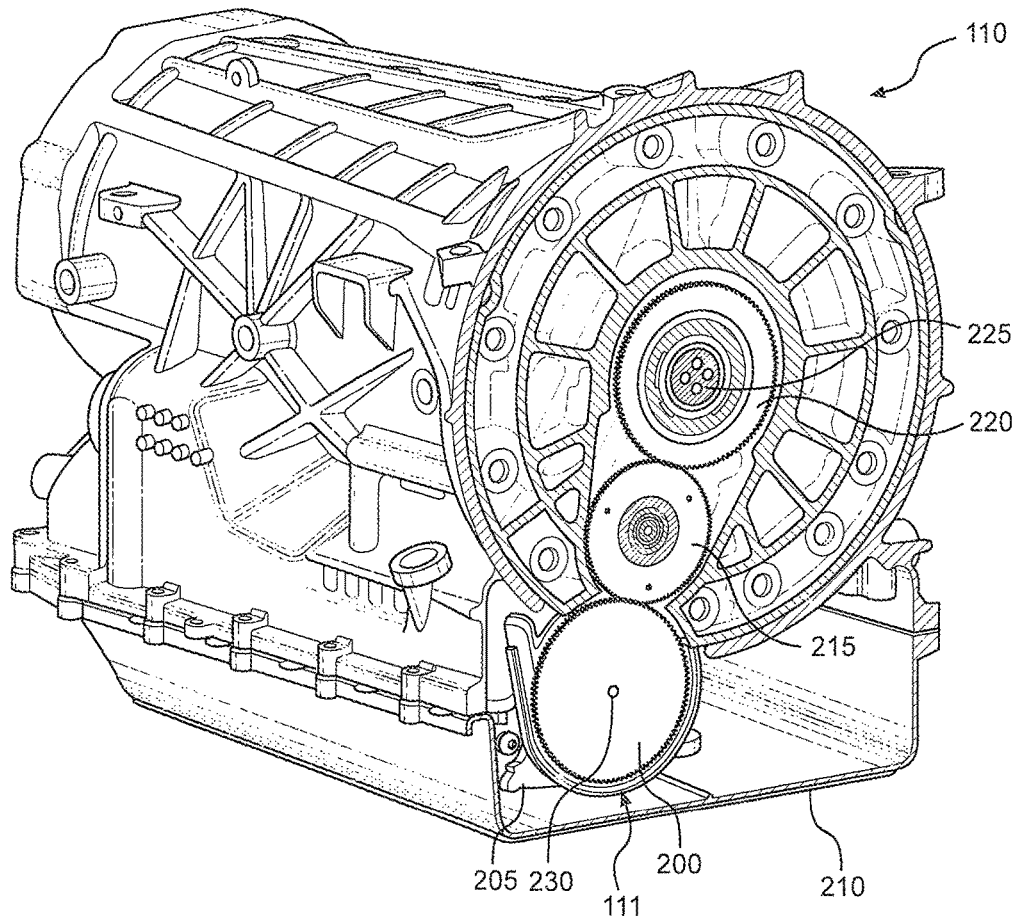
FIG. 2 is a perspective view, cut through a drive gear, of a transmission of the motor vehicle.

Referring now to FIG. 2, transmission 110 is shown cut through a drive gear 200 for a transmission pump 205. Both drive gear 200 and transmission pump 205, which together define a portion of transmission pump assembly 111, are located in a transmission sump 210, which contains transmission fluid. Drive gear 200 contacts an idler gear 215, which in turn contacts a transfer gear 220 coupled to an input shaft 225. As a result, power transmitted from power source 105 to transmission 110 through input shaft 225 causes drive gear 200 to rotate. This rotation is then transmitted from drive gear 200 to transmission pump 205 through a pump shaft 230. This provides power to transmission pump 205 so that it can circulate transmission fluid from transmission sump 210 to the other portions of transmission 110. Although this embodiment includes drive gear 200, it should be readily apparent that power can be transmitted from input shaft 225 to transmission pump 205 through a more generic pump-driving element if, for example, a belt or chain is used.

Figure 3:
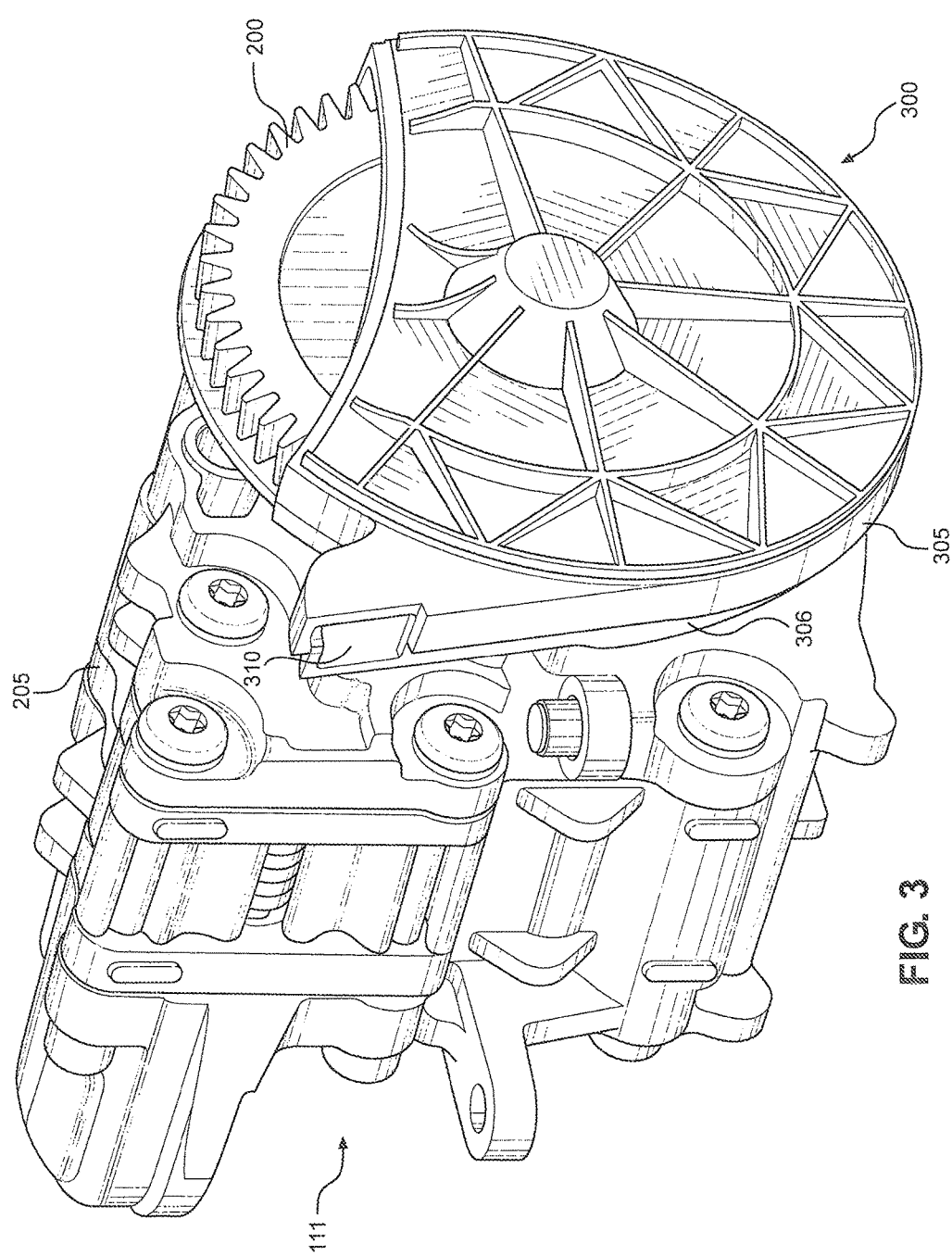
FIG. 3 is a perspective view of the drive gear, a transmission pump and a shroud for the drive gear.

FIG. 3 shows a perspective view of drive gear 200 and transmission pump 205, with drive gear 200 located inside a shroud 300. Together, drive gear 200, transmission pump 205 and shroud 300 define transmission pump assembly 111. As discussed above, drive gear 200 and transmission pump 205 are located in transmission sump 210 and, therefore, are at least partially submerged in transmission fluid. Shroud 300 separates drive gear 200 from transmission fluid, which greatly reduces drag on drive gear 200 relative to a configuration where drive gear 200 is not separated from transmission fluid and simply rotates within it. In a preferred embodiment, shroud 300 is formed from two pieces 305, 306 of an injection-molded, temperature- and fluid-resistant thermoplastic polymer. Pieces 305, 306 snap together to create shroud 300. Shroud 300 also preferably includes a discharge port 310 that allows any transmission fluid that accumulates in shroud 300 to be expelled as drive gear 200 rotates. With respect to FIG. 3, drive gear 200 rotates in a clockwise manner, and, accordingly, any transmission fluid in shroud 300 would travel in a clockwise manner along with drive gear 200 before being expelled through discharge port 310. This prevents transmission fluid from accumulating in shroud 300, which would create drag on drive gear 200 and thereby decrease the efficiency of transmission pump 205 and transmission 110.

Figure 4A:
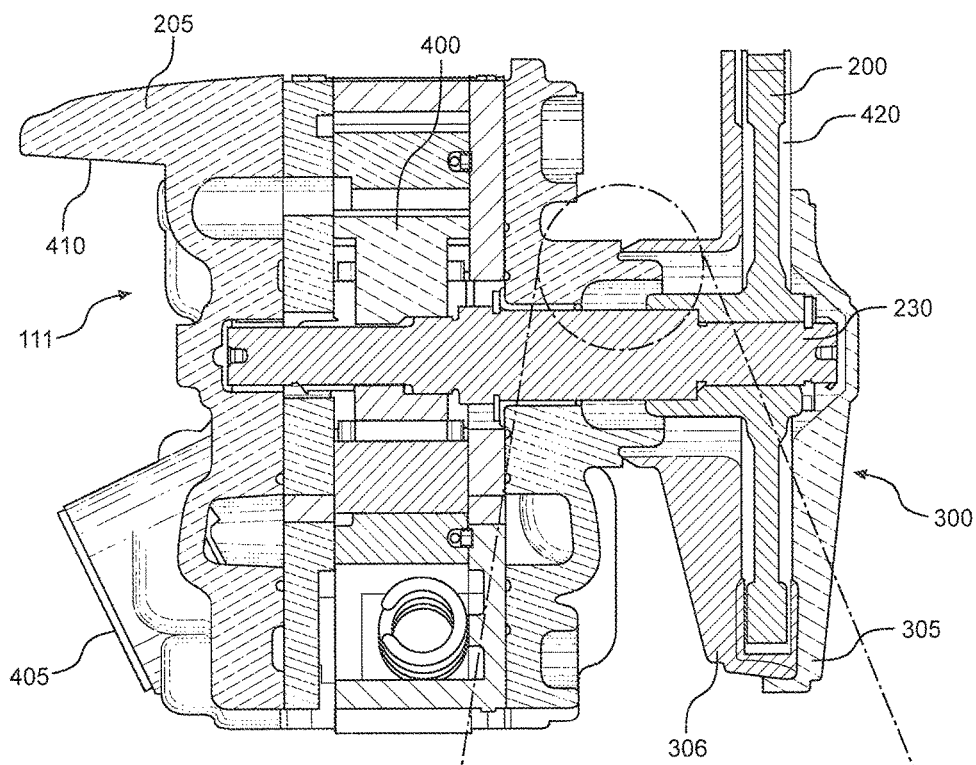
FIG. 4A is a cross-sectional view of the drive gear, the transmission pump and the shroud.

Turning now to FIG. 4A, there is shown a cross-sectional view of transmission pump assembly 111. As can be seen more clearly in this view, pump shaft 230 extends between drive gear 200 and transmission pump 205 and thereby transmits power from power source 105 to transmission pump 205 by way of input shaft 225, transfer gear 220, idler gear 215 and drive gear 200. In particular, when drive gear 200 rotates, pump shaft 230 also rotates, and this rotation is transferred to a pump element 400, which pulls transmission fluid in through an inlet 405 and sends it out through an outlet 410 in order to circulate transmission fluid throughout transmission 110.

Figure 4B:
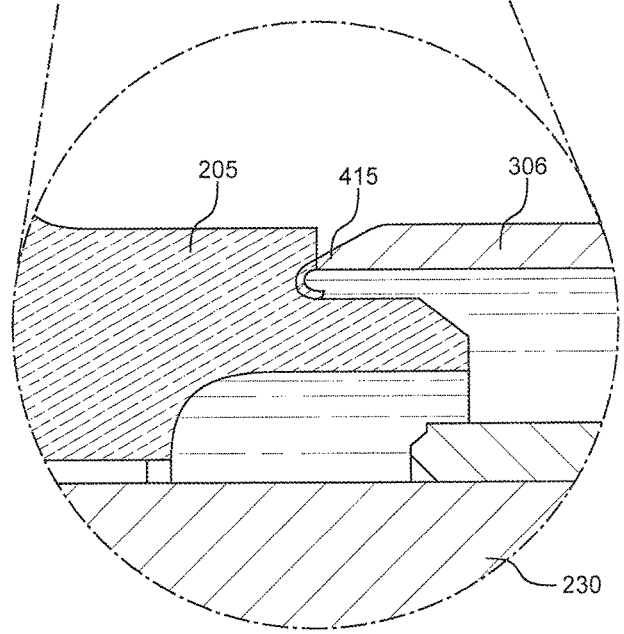
FIG. 4B is an enlarged view of a portion of FIG. 4A.

With continued reference to FIG. 4A, it can be seen that shroud 300 is spaced from drive gear 200 and pump shaft 230 so that they do not contact shroud 300 when rotating. Contact between drive gear 200 or pump shaft 230 and shroud 300 would create unwanted drag which, as discussed above, lowers the efficiency of transmission pump 205 and transmission 110. Additionally, a seal 415, best seen in FIG. 4B, is provided between shroud 300 and transmission pump 205 to reduce the amount of transmission fluid that enters shroud 300. It should be noted that, while shroud 300 separates drive gear 200 from transmission fluid in transmission sump 210, shroud 300 has an opening 420 in an upper portion thereof so that drive gear 200 can contact idler gear 215. As a result, some transmission fluid will enter shroud 300, although it is promptly expelled through discharge port 310 when drive gear 200 rotates.

Figure 5A:
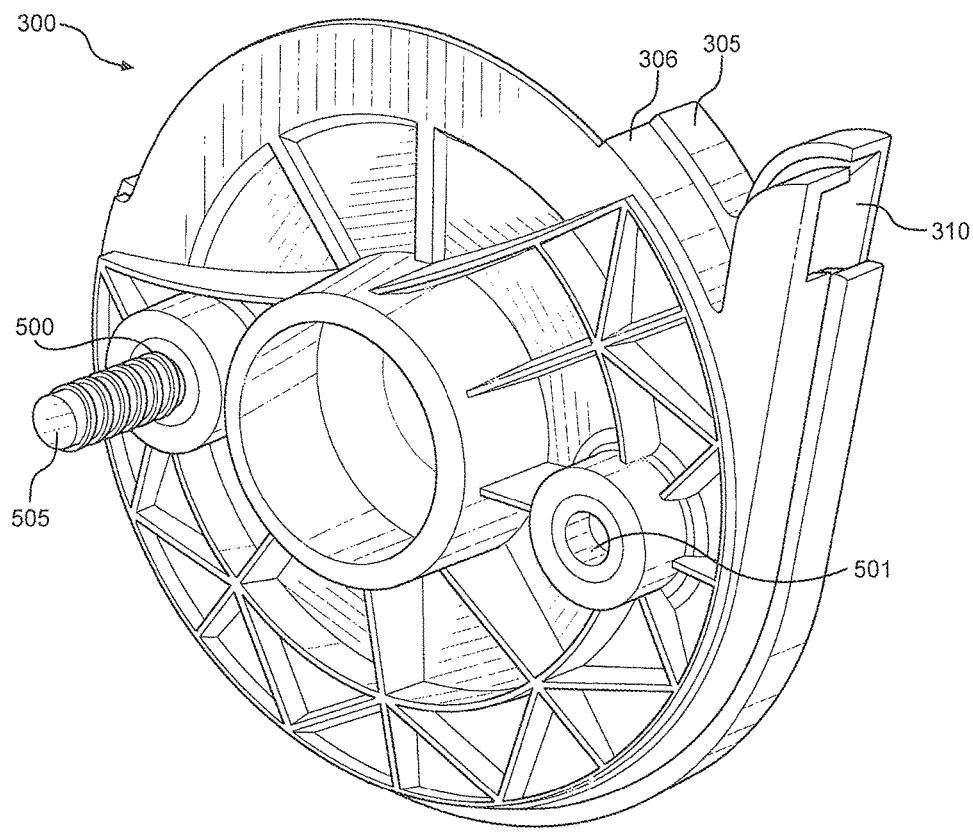
FIG. 5A is a perspective view of the shroud.
Figure 5B:
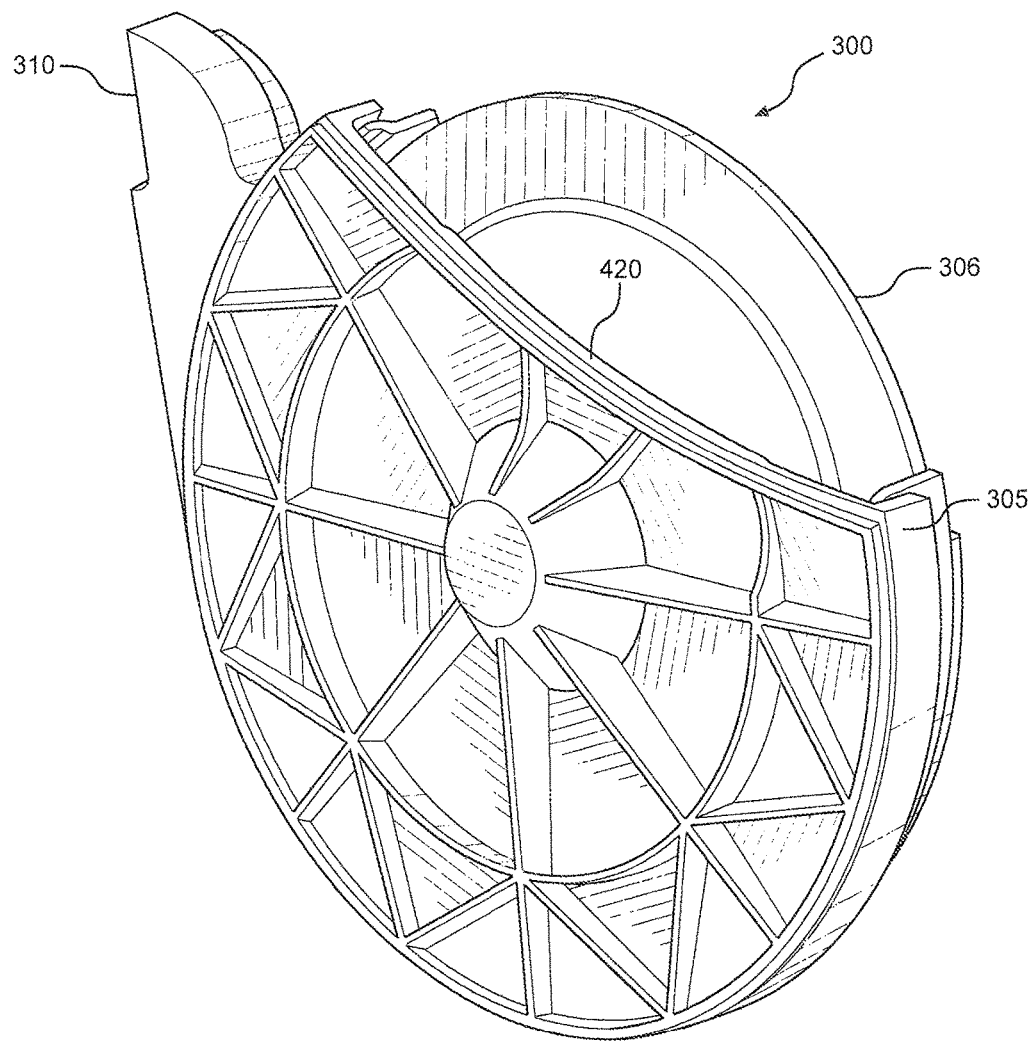
FIG. 5B is a second perspective view of the shroud.

FIGS. 5A and 5B show shroud 300 without drive gear 200 and uncoupled from transmission pump 205. As a result, mounting holes 500, 501 are more easily seen. Mounting holes 500, 501 enable coupling of shroud 300 to transmission pump 205. In one embodiment, mounting bolts, one of which is labeled 505, extend from mounting holes 500, 501 into transmission pump 205 in order to secure shroud 300 to transmission pump 205. However, a variety of mounting configurations can be used with the present invention so long as shroud 300 is securely coupled to transmission pump 205. Alternatively, in another embodiment, shroud 300 is formed integrally with transmission pump 205. In order to assemble transmission pump assembly 111, piece 306 of shroud 300 is inserted over pump shaft 230 and mounting bolts are inserted into mounting holes 500 and 501 to secure piece 306 to transmission pump 205. Next, drive gear 200 is coupled to pump shaft 230, and piece 305 of shroud 300 is coupled to piece 306 to partially enclose drive gear 200.

Based on the above, it should be readily apparent that the present invention provides a transmission arrangement where a transmission pump is located in a transmission sump, rather than on an input shaft, in order to save space and reduce the length of the transmission. Although described with reference to preferred embodiments, it should be readily understood that various changes or modifications could be made to the invention without departing from the spirit thereof. For example, power can be transmitted from the input shaft to the transmission pump in various other ways. Additionally, the present invention can be used with a wide range of transmissions. In general, the invention is only intended to be limited by the scope of the following claims.

The invention claimed is:
1. A transmission for a motor vehicle comprising:
   an input shaft;
   a transmission pump;
   a pump-driving element; and
   a transmission sump, the transmission pump being located at least partially in the transmission sump and configured such that power is transmitted from the input shaft to the transmission pump, wherein the pump-driving element is located at least partially in the transmission sump, and the pump-driving element is at least partially submerged in transmission fluid.
2. The transmission of claim 1, wherein the pump-driving element is configured such that power is transmitted from the input shaft to the transmission pump through the pump-driving element.
3. The transmission of claim 2, wherein the pump-driving element is a drive gear.
4. The transmission of claim 3, wherein the input shaft is connected to the drive gear by at least one gear, and the drive gear is connected to the transmission pump by a pump shaft.
5. The transmission of claim 2, further comprising a shroud, wherein the pump-driving element is at least partially enclosed by the shroud to separate the pump-driving element from transmission fluid located in the transmission sump, whereby drag on the pump-driving element is reduced.
6. The transmission of claim 5, wherein the shroud is directly coupled to or formed integrally with the transmission pump.
7. The transmission of claim 6, wherein the shroud includes a discharge port, the discharge port being configured so that transmission fluid located in the shroud is expelled through the discharge port when the pump-driving element rotates.
8. The transmission of claim 1, wherein the transmission pump is at least partially submerged in transmission fluid.
9. A transmission pump assembly for a motor vehicle including a transmission having an input shaft and a transmission sump, comprising:
   a transmission pump, wherein the transmission pump is located at least partially in the transmission sump and configured such that power is transmitted from the input shaft to the transmission pump, and a pump-driving element wherein the pump-driving element is located at least partially in the transmission sump, and the pump-driving element is at least partially submerged in transmission fluid.
10. The transmission pump assembly of claim 9, wherein the pump-driving element is configured such that power is transmitted from the input shaft to the transmission pump through the pump-driving element.
11. The transmission pump assembly of claim 10, wherein the pump-driving element is a drive gear.

12. The transmission pump assembly of claim 11, wherein the input shaft is connected to the drive gear by at least one gear, and the drive gear is connected to the transmission pump by a pump shaft.

13. The transmission pump assembly of claim 10, further comprising a shroud, wherein the pump-driving element is at least partially enclosed by the shroud to separate the pump-driving element from transmission fluid located in the transmission sump, whereby drag on the pump-driving element is reduced.

14. The transmission pump assembly of claim 13, wherein the shroud is directly coupled to or formed integrally with the transmission pump.

15. The transmission pump assembly of claim 14, wherein the shroud includes a discharge port, the discharge port being configured so that transmission fluid located in the shroud is expelled through the discharge port when the pump-driving element rotates.

16. The transmission pump assembly of claim 9, wherein the transmission pump is at least partially submerged in transmission fluid.

17. A method of pumping transmission fluid throughout a transmission of a motor vehicle having a power source configured to drive the vehicle and be connected to an input shaft of the transmission, said method comprising:
   rotating the input shaft to transmit power from the power source to the transmission; and
   transmitting power from the input shaft to a transmission pump located at least partially in a transmission sump, wherein the input shaft is configured to transmit power from the power source to the transmission pump, the transmission sump contains the transmission fluid, the transmission pump is located at least partially in the transmission sump and the transmission further includes a pump-driving element, wherein the pump-driving element is located at least partially in the transmission sump, and the pump-driving element is at least partially submerged in the transmission fluid.

18. The method of claim 17, wherein transmitting power from the input shaft to the transmission pump includes transmitting power from the input shaft to the transmission pump through the pump-driving element.

19. The method of claim 18, wherein transmitting power from the input shaft to the transmission pump through the pump-driving element includes:
   transmitting power from the input shaft to the pump-driving element through at least one gear; and
   transmitting power from the pump-driving element to the transmission pump through a pump shaft.

20. The method of claim 18, further comprising:
   reducing drag on the pump-driving element by separating the pump-driving element from the transmission fluid by at least partially enclosing the pump-driving element in a shroud.

21. The method of claim 20, further comprising:
   directly coupling the shroud to the transmission pump; or forming the shroud integrally with the transmission pump.

22. The method of claim 21, wherein the shroud has a discharge port, said method further comprising:
   expelling the transmission fluid from within the shroud through the discharge port by rotating the pump-driving element.

* * * * *